US010918118B2

(12) United States Patent
Jones et al.

(10) Patent No.: US 10,918,118 B2
(45) Date of Patent: Feb. 16, 2021

(54) CHEMICAL MITIGANTS IN ANIMAL FEED AND FEED INGREDIENTS

(71) Applicant: Kansas State University Research Foundation, Manhattan, KS (US)

(72) Inventors: Cassandra K. Jones, Belvue, KS (US); Roger A. Cochrane, Manhattan, KS (US); Jason C. Woodworth, Enterprise, KS (US); Steven S. Dritz, Manhattan, KS (US)

(73) Assignee: KANSAS STATE UNIVERSITY RESEARCH FOUNDATION, Manhattan, KS (US)

( * ) Notice: Subject to any disclaimer, the term of this patent is extended or adjusted under 35 U.S.C. 154(b) by 0 days.

(21) Appl. No.: 16/988,192

(22) Filed: Aug. 7, 2020

(65) Prior Publication Data

US 2020/0367530 A1 Nov. 26, 2020

Related U.S. Application Data

(63) Continuation of application No. 15/527,529, filed as application No. PCT/US2015/061564 on Nov. 19, 2015, now Pat. No. 10,772,343.

(60) Provisional application No. 62/081,847, filed on Nov. 19, 2014.

(51) Int. Cl.

| | |
|---|---|
| ***A23K 30/00*** | (2016.01) |
| ***A23K 50/42*** | (2016.01) |
| ***A23L 3/3472*** | (2006.01) |
| ***A23K 50/30*** | (2016.01) |
| ***A23L 3/3508*** | (2006.01) |
| ***A23K 20/158*** | (2016.01) |
| ***A23K 20/22*** | (2016.01) |
| ***A23L 3/358*** | (2006.01) |

(52) U.S. Cl.
CPC ............ *A23K 30/00* (2016.05); *A23K 20/158* (2016.05); *A23K 20/22* (2016.05); *A23K 50/30* (2016.05); *A23K 50/42* (2016.05); *A23L 3/3472* (2013.01); *A23L 3/3508* (2013.01); *A23L 3/358* (2013.01)

(58) Field of Classification Search
CPC ...... A23K 30/00; A23K 20/258; A23K 20/22; A23K 50/30; A23K 50/42; A23L 3/3472; A23L 3/3508; A23L 3/358
See application file for complete search history.

(56) References Cited

U.S. PATENT DOCUMENTS

| | | | |
|---|---|---|---|
| 4,346,118 | A | 8/1982 | Islam |
| 4,404,040 | A | 9/1983 | Wang |
| 5,234,703 | A | 8/1993 | Guthery |
| 5,246,716 | A | 9/1993 | Sedun et al. |
| 5,478,557 | A | 12/1995 | Nisbet et al. |
| 5,773,063 | A | 6/1998 | Knueven |
| 6,071,961 | A | 6/2000 | Wider |
| 6,500,861 | B1 | 12/2002 | Wider |
| 6,964,787 | B2 | 11/2005 | Swart et al. |
| 7,261,888 | B1 | 8/2007 | Decuypere et al. |
| 7,883,732 | B2 | 2/2011 | Koefod et al. |
| 8,372,425 | B2 | 2/2013 | Loftsson et al. |
| 8,377,485 | B2 | 2/2013 | Torrent |
| 8,962,683 | B2 | 2/2015 | Bruggeman |
| 9,144,575 | B2 | 9/2015 | Agnew et al. |
| 9,161,534 | B2 | 10/2015 | Petrucci et al. |
| 9,271,517 | B2 | 3/2016 | Bruggeman et al. |
| 9,555,116 | B2 | 1/2017 | Folan |
| 9,808,476 | B2 | 11/2017 | Bruggeman et al. |
| 10,076,115 | B2 | 9/2018 | Salminen et al. |
| 2002/0068065 | A1 | 6/2002 | Hendl et al. |
| 2002/0110561 | A1 | 8/2002 | Teagarden et al. |
| 2003/0176500 | A1 | 9/2003 | Molly et al. |
| 2004/0116523 | A1 | 6/2004 | Popoff |
| 2005/0151117 | A1 | 7/2005 | Man et al. |
| 2005/0255541 | A1 | 11/2005 | Flachmann et al. |
| 2006/0134239 | A1 | 6/2006 | Weide et al. |
| 2006/0257281 | A1 | 11/2006 | Weide et al. |
| 2007/0219270 | A1 | 9/2007 | Bruggeman |
| 2008/0230744 | A1 | 9/2008 | Hiramoto et al. |
| 2009/0082253 | A1 | 3/2009 | Otto et al. |
| 2010/0234328 | A1 | 9/2010 | Ahmed et al. |
| 2010/0317734 | A1 | 12/2010 | Folan et al. |
| 2011/0054026 | A1 | 3/2011 | Doyle et al. |

(Continued)

FOREIGN PATENT DOCUMENTS

| | | |
|---|---|---|
| CN | 102488117 A | 6/2012 |
| CN | 102892303 A | 1/2013 |

(Continued)

OTHER PUBLICATIONS

Cochrane, R.A. et al., "Effect of Thermal Mitigation on Porcine Epidemic Diarrhea Virus (PEDV)—Contaminated Feed", Kansas Agricultural Experiment Station Research Reports, vol. 1 Issue 7, Jan. 1, 2015, 14 pages.
Cochrane, R.A. et al., "Evaluating Chemical Mitigation of Porcine Epidemic Diarrhea Virus (PEDV) in Swine Feed and Ingredients", COCHRANE, et al., "Evaluating Chemical Mitigation of Porcine Epidemic Diarrhea Virus (PEDV) in Swine Feed and Ingredients", Report, Swine Day, vol. 1, Issue 7, Article 5, 10 pages., Jan. 1, 2015.
Huang, Chifu B. et al., "Short- and medium-chain fatty acids exhibit antimicrobial activity for oral microorganisms", Arch Oral Biol. vol. 56 No. 7, Jul. 2011, pp. 650-654.

(Continued)

*Primary Examiner* — C. Sayala
(74) *Attorney, Agent, or Firm* — Dorsey & Whitney LLP

(57) ABSTRACT

Methods of preventing or decreasing PEDv and/or *Salmonella* bacteria in animal feed, feed ingredients, and pet food are provided. The methods utilize generally safe chemical mitigants, such as medium chain fatty acids, essential oils, and sodium bisulfate. The chemical mitigants are introduced to the feed or feed ingredients at inclusion rates selected so as to prevent or decrease PEDv and/or *Salmonella* bacteria in the animal feed, feed ingredients, or pet food. The methods are particularly suitable for use in post-processing treatment of animal feed, feed ingredients, or pet food that will be transported and stored for multiple days or weeks.

11 Claims, No Drawings

(56) References Cited

U.S. PATENT DOCUMENTS

| | | | |
|---|---|---|---|
| 2011/0311634 | A1 | 12/2011 | Goethals |
| 2012/0041065 | A1 | 2/2012 | Appleby et al. |
| 2012/0128843 | A1 | 5/2012 | Richardson et al. |
| 2012/0252893 | A1 | 10/2012 | Pimentel |
| 2012/0289591 | A1 | 11/2012 | Folan |
| 2012/0301580 | A1 | 11/2012 | Knueven |
| 2012/0309830 | A1 | 12/2012 | Man et al. |
| 2013/0034629 | A1 | 2/2013 | Goethals |
| 2014/0037698 | A1 | 2/2014 | Pablos Perez |
| 2014/0154356 | A1 | 6/2014 | Burke et al. |
| 2014/0275267 | A1 | 9/2014 | Beug-Deeb et al. |
| 2014/0323572 | A1 | 10/2014 | Pimentel et al. |
| 2014/0357718 | A1 | 12/2014 | Feuerstein et al. |
| 2015/0025145 | A1 | 1/2015 | Hollander et al. |
| 2015/0031762 | A1 | 1/2015 | Pimentel et al. |
| 2015/0224072 | A1 | 8/2015 | Pellikaan |
| 2015/0258057 | A1 | 9/2015 | Rombi |
| 2016/0205970 | A1 | 7/2016 | Bruggeman et al. |
| 2016/0213029 | A1 | 7/2016 | Bruggeman et al. |
| 2016/0250239 | A1 | 9/2016 | Bruggeman et al. |
| 2017/0354167 | A1 | 12/2017 | Jones et al. |

FOREIGN PATENT DOCUMENTS

| | | | |
|---|---|---|---|
| CN | 103140141 | A | 6/2013 |
| EP | 0709092 | A2 | 5/1996 |
| GB | 2503235 | A | 12/2013 |
| IE | 20080959 | A1 | 9/2009 |
| JP | H05276878 | A | 10/1993 |
| WO | 9004331 | A1 | 5/1990 |
| WO | 9803066 | A1 | 1/1998 |
| WO | 9809520 | A1 | 3/1998 |
| WO | 9966804 | A1 | 12/1999 |
| WO | 0036928 | A1 | 6/2000 |
| WO | 03043441 | A1 | 5/2003 |
| WO | 2006002927 | A2 | 1/2006 |
| WO | 2009006466 | A1 | 1/2009 |
| WO | 2011134802 | A1 | 11/2011 |
| WO | 2012018913 | A1 | 2/2012 |
| WO | 2013184879 | A2 | 12/2013 |
| WO | 2014167554 | A2 | 10/2014 |
| WO | 2014188035 | A1 | 11/2014 |
| WO | 2015052672 | A1 | 4/2015 |

OTHER PUBLICATIONS

"Coconut Oil Viral Illness: Your Simple, Risk-Free and Potent Virus Killer", Retrieved from http://web.archive.org/web/20140629041658/http://www.coconut-oil-central.com/coconut-oil-viral-illness.html, 3 pages.

Bajpai, et al., "Control of Salmonella in Foods by Using Essential Oils: A Review", Food Research International, vol. 45, No. 2, pp. 722-734, 2012, Elsevier.

Huang, et al., "Short- and Medium-Chain Fatty Acids Exhibit Antimicrobial Activity for Oral Microorganisms", Archives of Oral Biology, vol. 56, No. 7, pp. 650-654, Jul. 2011, Pergamon Press, Oxford, GB.

Sprong, et al., "Bactericidal Activities of Milk Lipids", Antimicrobial Agents and Chemotherapy, vol. 45, No. 4, pp. 1298-1301, Apr. 2001, American Society for Microbiology.

Thacker, "Alternatives to Antibiotics as Growth Promoters for Use in Swine Production: A Review", Journal of Animal Science and Biotechnology, vol. 4, No. 35, 12 pages, 2013.

Thormar, et al., "Inactivation of Enveloped Viruses and Killing of Cells by Fatty Acids and Monoglycerides", Antimicrobial Agents and Chemotherapy, vol. 31, No. 1, pp. 27-31, Jan. 1987, American Society for Microbiology.

Kim, Jong-Im, "Anti-Porcine Epidemic Diarrhea Virus (PEDV) Activity and Antimicrobial Activities of Artemisia dubia Essential Oil", Korean Journal of Microbiology and Biotechnology, vol. 40, No. 4, pp. 396-402, 2012, The Korean Society for Microbiology and Biotechnology.

CHEMICAL MITIGANTS IN ANIMAL FEED AND FEED INGREDIENTS

CROSS-REFERENCE TO RELATED APPLICATIONS

The present application is a continuation of U.S. patent application Ser. No. 15/527,529, filed May 17, 2017, issued as U.S. Pat. No. 10,772,343, which is a U.S. National Stage Application of International Patent Application No. PCT/US2015/061564, filed Nov. 19, 2015, which claims the priority benefit of U.S. Provisional Patent Application Ser. No. 62/081,847, filed Nov. 19, 2014, entitled USE OF MEDIUM CHAIN FATTY ACIDS AND ESSENTIAL OILS AS A WAY TO MITIGATE *SALMONELLA* AND PORCINE EPIDEMIC DIARRHEA VIRUS (PEDv) IN ANIMAL FEED AND INGREDIENTS, incorporated by reference in its entirety herein.

BACKGROUND OF THE INVENTION

Field of the Invention

The present invention is broadly concerned with methods of inhibiting PEDv and/or *Salmonella* bacteria in animal feed, feed ingredients, and pet food.

Description of the Prior Art

Porcine Epidemic Diarrhea virus (PEDv) is a coronavirus that is responsible for the death of over 8 million pigs in the United States. The virus affects pigs of all stages, but is particularly catastrophic to suckling pigs because of their less developed digestive tracts, which cannot absorb nutrients in the small intestine. The virus causes severe diarrhea and vomiting. The virus is not transmissible to other species, and the pork is safe to consume. However, poor animal health and performance has led to a low pork supply, which is the source of record U.S. pork prices for consumers. The virus is transmitted by fecal-oral contamination, but epidemiological and controlled research evidence has confirmed swine feed or ingredients are another vector of transmission.

In addition, *Salmonella* spp. cross-contamination of ingredients is a major concern in the feed and rendering industries. The first documented case of *Salmonella* spp. contamination in animal feed was as far back as 1948. Due to the historical occurrence of *Salmonella* spp. in animal feed, the United States Food and Drug Administration carried out surveys of pathogen contamination in animal-based rendering plants across the United States. Of the 101 animal-based protein samples collected in 1993, 56% tested positive for *Salmonella enterica*. As a follow-up, finished feed samples from feed mills and on-site farms were tested in 1994, and the FDA reported that 25% of the 89 samples tested were positive for *S. enterica*. Since then, other studies have shown similar results, including a study wherein 85% of 165 samples tested were positive for gram negative bacteria and 10% were positive for *Salmonella* spp. While *Salmonella* spp. may be perceived as a lower risk hazard in animal feed, *Salmonellosis* of animals has been linked to human illness.

Moreover, *Salmonella* bacteria has become an increasing issue in pet food. In 2007, a *Salmonella schwarzengrund* outbreak impacted 105 pet food brands, in 21 states. While the outbreak led to no known pet deaths, there were 79 cases of human illness and 1 pet food plant closure. As a result, pet food has been elevated to a potential "hazard," which sets pet food apart from livestock feed rules. This forced a concerted effort by industry to staff and comply with anticipated rules, with efforts focused on *Salmonella*. This resulted in increased analysis frequency (and cost) and implementation of "best-guess" strategies for control. In reality, some facilities will never be able to meet the new standards.

While some mitigation strategies for PEDv and *Salmonella* have been proposed and tested, previous strategies suffer a number of drawbacks including facilities with limited capacity, efficacy dependent on viral particle and genomic size, and various unknowns regarding effective dosages and negative effects on other nutritional components. Therefore, new strategies are needed to inhibit PEDv and *Salmonella* bacteria in feed and feed ingredients.

SUMMARY OF THE INVENTION

In an embodiment of the present invention, there is provided a method of inhibiting porcine epidemic diarrhea virus in animal feed or animal feed ingredients. The method comprises introducing a chemical mitigant to the feed or feed ingredients. The chemical mitigant comprises a medium chain fatty acid and/or an essential oil, and the chemical mitigant is introduced to the feed or feed ingredients at an inclusion rate of from about 0.01 weight % to about 5 weight %.

In another embodiment, there is provided a method of inhibiting *Salmonella* bacteria in animal feed or animal feed ingredients. The method comprises introducing a chemical mitigant to the feed or feed ingredients. The chemical mitigant comprises a medium chain fatty acid, an essential oil, and/or sodium bisulfate, and the chemical mitigant is introduced to the feed or feed ingredients at an inclusion rate of from about 0.01 weight % to about 5 weight %.

In still another embodiment, there is provided an animal feed comprising from about 0.01 weight % to about 5 weight % of a medium chain fatty acid and/or an essential oil.

In yet another embodiment, there is provided a pet food comprising from about 0.1 weight % to about 2 weight % of sodium bisulfate.

DETAILED DESCRIPTION OF THE PREFERRED EMBODIMENT

In more detail, the present invention is concerned with methods of inhibiting PEDv and/or *Salmonella* bacteria in animal feed, feed ingredients, and pet food. More specifically, the present invention relates to the use of chemical mitigants to inhibit PEDv and/or *Salmonella* in various types of animal and pet food ingredients, as well as complete feed meals and pet food products. As used herein, "inhibit" or "inhibiting" refers to the reduction of the measurable levels of the target microbe (i.e., PEDv or *Salmonella*) or decrease in the rate of growth of the microbe as compared to an untreated control. In certain embodiments, methods in accordance with the present invention use an effective amount of a chemical mitigant to inhibit PEDv in animal feed or animal feed ingredients, for example, below the levels of detection through RT-PCR. In certain other embodiments, methods in accordance with the present invention use an effective amount of a chemical mitigant to inhibit *Salmonella* bacteria growth in animal feed or animal feed ingredients. As used herein, an "effective amount" refers to an amount capable of providing bioavailable levels of the active compound (i.e., medium chain fatty acids, essential oils, and/or sodium bisulfate) sufficient to achieve the desired performance improvement. In preferred embodiments, methods in accordance with the present invention are advantageously adapted to be used in animal feed ingredient transport and storage.

Chemical mitigants for use in certain embodiments of the present invention can include medium chain fatty acids, essential oils, and/or sodium bisulfate. Medium chain fatty acids are acids having an aliphatic tail of 6 to 12 carbon atoms. In certain embodiments, medium chain fatty acids for use in the present invention include caproic acid, caprylic acid, capric acid, and/or lauric acid. Therefore, in certain embodiments, the chemical mitigant is selected from the group consisting of caproic acid, caprylic acid, capric acid, lauric acid, and mixtures thereof. However, in certain other embodiments, the chemical mitigant is free of lauric acid. Therefore, in such embodiments the chemical mitigant may be selected from the group consisting of caproic acid, caprylic acid, capric acid, and mixtures thereof. In certain embodiments, a blend of medium chain fatty acids may be used. For example, in certain embodiments, a blend of two or more medium chain fatty acids may be introduced to the feed or feed ingredients. In certain embodiments, a blend of caproic acid, caprylic acid, and capric acid is introduced to the feed or feed ingredients at a weight ratio of about 1:1:1 (equal parts). However, it is within the scope of the present invention that blends comprising other weight ratios of caproic acid, caprylic acid, and capric acid may be used. While any effective amount of chemical mitigant may be used, in certain embodiments the medium chain fatty acid or blend may be introduced to the animal feed and/or animal feed ingredients at an inclusion rate of from about 0.01 weight % to about 5 weight %, more preferably from about 0.5 weight % to about 3 weight %, even more preferably from about 1 weight % to about 2.5 weight %, and most preferably about 2 weight %, based upon the total weight of the feed or feed ingredient taken as 100% by weight.

Essential oils are concentrated hydrophobic liquids containing volatile aromatic compounds derived from plants. A number of different essential oils exist which may be used in certain embodiments of the present invention. A non-exclusive list of these essential oils include: Agar oil, Ajwain oil, Angelica root oil, Anise oil, Asafoetida, Balsam of Peru, Basil oil, Bay oil, Bergamot oil, Black Pepper, Buchu oil, Birch, Camphor, Cannabis flower essential oil, Caraway oil, Cardamom seed oil, Carrot seed oil, Cedarwood oil, Chamomile oil, Calamus Root, Cinnamon oil, Cistus species, Citron, Citronella oil, Clary Sage, Clove oil, Coffee, Coriander, Costmary oil (bible leaf oil), Costus Root, Cranberry seed oil, Cubeb, Cumin oil/Black seed oil, Cypress, Cypriol, Curry leaf, Davana oil, Dill oil, Elecampane, Eucalyptus oil, Fennel seed oil, Fenugreek oil, Fir, Frankincense oil, Galangal, Galbanum, Geranium oil, Ginger oil, Goldenrod, Grapefruit oil, Henna oil, Helichrysum, Hickory nut oil, Horseradish oil, Hyssop, Idaho Tansy, Jasmine oil, Juniper berry oil, Laurus nobilis, Lavender oil, Ledum, Lemon oil, Lemongrass, Lime, Litsea cubeba oil, Linaloe, Mandarin, Marjoram, Melaleuca See Tea tree oil, Melissa oil (Lemon balm), Mentha arvensis oil/Mint oil, Moringa oil, Mountain Savory, Mugwort oil, Mustard oil (essential oil), Myrrh oil, Myrtle, Neem oil or Neem Tree Oil, Neroli, Nutmeg, Orange oil, Oregano oil, Orris oil, Palo Santo, Parsley oil, Patchouli oil, Perilla essential oil, Pennyroyal oil, Peppermint oil, Petitgrain, Pine oil, Ravensara, Red Cedar, Roman Chamomile, Rose oil, Rosehip oil, Rosemary oil, Rosewood oil, Sage oil, Sandalwood oil, Sassafras oil, Savory oil, Schisandra oil, Spearmint oil, Spikenard, Spruce, Star anise oil, Tangerine, Tarragon oil, Tea tree oil, Thyme oil, Tsuga, Turmeric, Valerian, Vetiver oil (khus oil), Western red cedar, Wintergreen, Yarrow oil, Ylang-ylang, and Zedoary. In certain embodiments, the chemical mitigant is selected from the group consisting of garlic oleoresin, turmeric oleoresin, capsicum oleoresin, rosemary extract, wild oregano essential oil, and mixtures thereof. In certain embodiments, a blend of essential oils may be used. For example, in certain embodiments, a blend of two or more essential oils may be introduced to the feed or feed ingredients. In certain embodiments, a blend of essential oils comprising equal parts of garlic oleoresin, turmeric oleoresin, capsicum oleoresin, rosemary extract, and wild oregano essential oil is introduced to the feed or feed ingredients. However, it is within the scope of the present invention that blends comprising other weight ratios of garlic oleoresin, turmeric oleoresin, capsicum oleoresin, rosemary extract, and wild oregano essential oil may be used. In certain embodiments, the essential oil or blend may be introduced to the animal feed and/or animal feed ingredients at an inclusion rate of from about 0.01 weight % to about 5 weight %, more preferably from about 0.5 weight % to about 3 weight %, even more preferably from about 1 weight % to about 2.5 weight %, and most preferably about 2 weight %, based upon the total weight of the feed or feed ingredient taken as 100% by weight.

In certain embodiments, a blend comprising one or more medium chain fatty acids and one or more essential oils may be used. In certain embodiments the blend comprising one or more medium chain fatty acids and one or more essential oils may be introduced to the animal feed and/or animal feed ingredients at an inclusion rate of from about 0.01 weight % to about 5 weight %, more preferably from about 0.5 weight % to about 3 weight %, even more preferably from about 1 weight % to about 2.5 weight %, and most preferably about 2 weight %, based upon the total weight of the feed or feed ingredient taken as 100% by weight.

In certain embodiments, the chemical mitigant is sodium bisulfate. Sodium bisulfate is an acid salt that is considered "Generally Recognized as Safe" (GRAS) and a "natural product" by the FDA. In certain embodiments, sodium bisulfate can be dissolved into solution and applied to the surface of an animal food or food ingredient to prevent or decrease *Salmonella* bacteria growth. In certain embodiments, sodium bisulfate solution is applied to the surface of a dry pet food or pet food ingredient. For example, the solution may be applied to the surface of dry dog food (kibbles) or dry cat food. In certain embodiments the solution may be applied to the surface of the feed or ingredient so as to provide sodium bisulfate at an inclusion rate of from about 0.1 weight % to about 2 weight %, more preferably from about 0.15 weight % to about 1.5 weight %, even more preferably from about 0.2 weight % to about 1 weight %, based upon the total weight of the feed or feed ingredient taken as 100% by weight.

Chemical mitigants used in accordance with the present invention may be used to treat a wide variety of animal feed or animal feed ingredients. In certain embodiments, however, the methods in accordance with the present invention are particularly suited for use with porcine feed and feed ingredients. In such embodiments, the animal feed or animal feed ingredients may be selected from the group consisting of complete swine diet, blood meal, porcine meat and bone meal (MBM), and spray-dried animal plasma. In certain embodiments, the animal feed ingredients may comprise ingredients selected from the group consisting of vitamin D, lysine hydrochloride, choline chloride, and soybean meal. In other embodiments, the chemical mitigant may be used with pet food and pet food ingredients. In certain embodiments, the pet food and pet food ingredients comprise dry dog food (kibble) and/or cat food.

Methods in accordance with certain embodiments of the present invention may be used in the production of animal or pet feeds. Therefore, in one embodiment of the present invention, there is provided an animal feed comprising from about 0.01 weight % to about 5 weight %, more preferably from about 0.5 weight % to about 3 weight %, even more preferably from about 1 weight % to about 2.5 weight %, and most preferably about 2 weight %, of a chemical mitigant or blend of chemical mitigants (such as the chemical mitigants and blends described herein), based upon the total weight of the feed taken as 100% by weight. In other embodiments, there is provided a pet food comprising from about 0.1 weight % to about 2 weight %, more preferably from about 0.15 weight % to about 1.5 weight %, even more preferably from about 0.2 weight % to about 1 weight % of sodium bisulfate, based upon the total weight of the pet food taken as 100% by weight.

Embodiments of the present invention are particularly suitable for use in the transport of feed and feed ingredients. Feed or ingredients may become contaminated with PEDv and/or *Salmonella* at the point of processing, and it has been discovered that these contaminants may survive and grow for days or weeks with the feed or ingredients under conditions generally experienced during overseas transport and storage. Advantageously, embodiments of the present invention are particularly suitable to inhibit or prevent the growth of these contaminants. Therefore, in certain embodiments, methods in accordance with the present invention comprise introducing the chemical mitigant to the feed or feed ingredients after processing. The chemical mitigant may be mixed with the feed or feed ingredients for sufficient time so as to provide a homogeneous mixture. In certain embodiments, methods in accordance with the present invention may prevent or decrease PEDv virus and/or *Salmonella* bacteria in feed and/or ingredients for at least about 90 days of transport and storage after processing, at least about 60 days of transport and storage after processing, at least about 40 days of transport and storage after processing, or at least about 37 days of transport and storage after processing.

Embodiments of the present invention advantageously provide a safe alternative method of preventing or decreasing PEDv and/or *Salmonella* bacteria in animal or pet feed and ingredients. Prior methods using harmful chemicals have displayed negative effects on protein and amino acid metabolism of animals. Unlike prior methods, the present invention uses generally non-hazardous chemical mitigants at doses discovered to achieve effective mitigation of PEDv and *Salmonella*. The chemical mitigants used in accordance with the present invention are natural alternatives that pose essentially no risk to the safety of workers or the environment.

EXAMPLES

The following examples set forth the effectiveness of various chemical mitigation strategies on post-processing contamination of PEDv and *Salmonella* bacteria in feed and feed ingredients. It is to be understood, however, that these examples are provided by way of illustration and nothing therein should be taken as a limitation upon the overall scope of the invention.

Example I

In a first study, experiments were conducted to determine and confirm the minimum infectious dose of PEDv in a feed matrix using a 10-day old pig bioassay. Doses of various concentrations of PEDv were prepared in tissue culture media by serial 10-fold dilution. The mixer was flushed with 4.5 kg of uninfected feed between each serial dilution. The only detectable PEDv in the flush was detected after mixing the $5.6\times10^4$ TCID50/g, and the Ct was merely 38. This suggests flushing or sequencing might reduce risk of cross contamination. Notably, however, this showed that cross contamination was detected and presumably could result in infected pigs. The dilutions were added to 4.5 kg of complete feed and blended for 2.5 minutes to homogenize and distribute the PEDv virus. This resulted in feed dilutions from $5.6\times10^4$ to $5.6\times10^{-4}$ TCID50/g. The blended feed was added to phosphate-buffered saline (PBS) and supernatant, refrigerated overnight at 40° F., and then collected for bioassay. The bioassay included inoculation into 3 pigs per dose plus a non-inoculated control.

PCR analysis of inoculated feeds indicated that 5.6×10 TCID50/g could be detected (Ct≈37). Loss of about 10 Ct occurred when the dose was placed in feed compared to inoculation media. Visible signs of PEDv infection and PCR positive fecal samples were present in all pigs that received PCR-positive inoculated feed. This clearly established PEDv infection. The minimum infections dose (MID) of PEDv appeared to be ≈5.6×10 TCID50/g in a feed matrix.

Example II

In a second study, experiments were conducted to determine the impact of conditioning time and temperature of pelleted complete feed. Treatments were organized in a 2×3×3 factorial with the following variables: PEDv dose (low and high); conditioning time (45 s, 90 s, and 180 s); and conditioning temperature (155° F., 175° F., 195° F.). The feed was collected for PCR analysis, as well as used for 10-day old pig bioassay. The results of this study are shown in Tables 1 and 2, below.

TABLE 1

Low Dose PCR Ct Values.

| | Time, sec | | |
|---|---|---|---|
| Temp, F. | 45 | 90 | 180 |
| 155 | 39 | 38 | 40 |
| 175 | 37 | 38 | 39 |
| 195 | 37 | 37 | 36 |

Low Dose Feed No processing = 31
Low Dose Tissue Culture = 20

TABLE 2

High Dose PCR Ct Values

| | Time, sec | | |
|---|---|---|---|
| Temp, F. | 45 | 90 | 180 |
| 155 | 30 | 30 | 30 |
| 175 | 30 | 30 | 30 |
| 195 | 30 | 31 | 30 |

High Dose Feed No processing = 24
High Dose Tissue Culture = 13

Example III

In a third study, experiments were conducted to evaluate the effectiveness of various chemical mitigation strategies on post-processing contamination of PEDv in feed and feed components. Treatments were arranged in a 7-4 factorial with 6 chemical treatments plus a control, and 4 feed matrices. The 6 chemical treatments included: 1) commercial formaldehyde blend (TERMIN-8), 2) sodium bisulfate, 3) sodium chlorate, 4) organic acid blend, 5) medium chain fatty acids (blend comprising approximately equal parts caproic acid, caprylic acid, and capric acid), and 6) essential oils (blend comprising approximately equal parts garlic oleoresin, turmeric oleoresin, capsicum oleoresin, rosemary extract, and wild oregano essential oil). The 4 feed matrices included: 1) complete swine diet (complete nursery diet), 2) blood meal, 3) porcine meat and bone meal (MBM), and 4) spray-dried animal plasma. The 4 feed treatments×6 chemical treatments (plus 1 control) equaled 28-1 kg batches. The feed matrices were chemically treated first and then inoculated to represent post-processing contamination. The inoculation utilized PEDv grown in cell culture with a concentration of $5.6\times10^4$ TCID50/g. Samples were taken on days 0, 1, 3, 7, 14, 21, and 42. There were 3 segregated replicates of each batch for each day of analysis. All samples were stored at room temperature. Untreated control supernant from each of the 4 feed matrixes on day 0 was harvested and aliquots frozen and used as controls for subsequent analysis days. Each day these samples were used as laboratory controls to evaluate inter assay variation.

Samples were analyzed for PEDv by RT-PCR. Analyzed values represent cycle time or cycle threshold (Ct) before detection. Lower Ct values indicate greater nucleic acid presence, but not necessarily infectivity. Data were analyzed using the GLIMMIX procedure of SAS with fixed effects of chemical treatment, matrix, and time, as well as all interactions. The results of the study are shown in Tables 3-8, below.

TABLE 5

PEDv contamination post-treatment in blood meal stored at room temperature.

| | Porcine Blood Meal Average Ct Count | | | | | | |
|---|---|---|---|---|---|---|---|
| Day/Treatment | 0 | 1 | 3 | 7 | 14 | 21 | 42 |
| Termin-8 | 31 | 32 | 33 | 34 | 36 | 38 | 37 |
| Sodium bisulfate | 31 | 31 | 32 | 32 | 31 | 34 | 35 |
| Sodium chlorate | 29 | 29 | 31 | 32 | 33 | 36 | 36 |
| Organic acids | 32 | 33 | 34 | 34 | 34 | 34 | 34 |
| Medium chain fatty acids | 32 | 31 | 33 | 33 | 33 | 33 | 33 |
| Essential oils | 26 | 26 | 27 | 28 | 37 | 39 | 40 |
| Untreated control | 31 | 31 | 32 | 32 | 35 | 36 | 36 |

TABLE 6

PEDv contamination post-treatment in porcine meat and bone meal stored at room temperature.

| | Porcine Meat and Bone Meal Average CT Count | | | | | | |
|---|---|---|---|---|---|---|---|
| Day/Treatment | 0 | 1 | 3 | 7 | 14 | 21 | 42 |
| Termin-8 | 28 | 28 | 29 | 30 | 30 | 30 | 30 |
| Sodium bisulfate | 27 | 26 | 27 | 28 | 29 | 30 | 29 |
| Sodium chlorate | 26 | 25 | 27 | 27 | 28 | 27 | 29 |
| Organic acids | 26 | 26 | 28 | 29 | 30 | 30 | 30 |
| Medium chain fatty acids | 26 | 25 | 28 | 28 | 29 | 29 | 30 |
| Essential oils | 26 | 26 | 27 | 29 | 30 | 30 | 30 |
| Untreated control | 26 | 26 | 27 | 28 | 28* | 29 | 29 |

*Untreated control value for day 14 is average of day 7 and day 21.

TABLE 3

Ct values of control samples for evaluating inter assay variation.

| | Day 0 | Day 1 | | Day 3 | | Day 7 | | Day 14 | | Day 21 | | Day 42 | |
|---|---|---|---|---|---|---|---|---|---|---|---|---|---|
| Diet | 28.2 | 29.3 | 28.8 | 29.1 | 28.8 | 29.2 | 28.6 | 28.3 | 28.2 | 28.8 | 28.6 | 28.8 | 28.6 |
| BloodM | 30.6 | 31.5 | 31.3 | 31.4 | 31.3 | 31.5 | 31.3 | 31.0 | 31.0 | 31.3 | 31.0 | 31.1 | 31.2 |
| PMBM | 26.4 | 26.2 | 25.9 | 26.2 | 26.2 | 26.0 | 26.1 | 26.0 | 26.0 | 26.3 | 26.2 | 26.3 | 26.2 |
| SDAP | 28.2 | 27.0 | 26.6 | 27.3 | 26.6 | 27.7 | 28.1 | 27.4 | 27.2 | 27.3 | 26.5 | 26.8 | 26.7 |
| Avg: | 28.3 | 28.3 | | 28.4 | | 28.6 | | 28.1 | | 28.3 | | 28.2 | |

TABLE 4

PEDv contamination post-treatment in swine diet stored at room temperature.

| | Swine Diet Average Ct Count | | | | | | |
|---|---|---|---|---|---|---|---|
| Day/Treatment | 0 | 1 | 3 | 7 | 14 | 21 | 42 |
| Termin-8 | 31 | 31 | 30 | 33 | 32 | 34 | 34 |
| Sodium bisulfate | 28 | 28 | 29 | 30 | 30 | 33 | 32 |
| Sodium chlorate | 28 | 28 | 29 | 30 | 29 | 32 | 32 |
| Organic acids | 30 | 30 | 30 | 32 | 33 | 34 | 33 |
| Medium chain fatty acids | 34 | 34 | 36 | 38 | 38 | 38 | 37 |
| Essential oils | 32 | 32 | 32 | 34 | 34 | 34 | 37 |
| Untreated control | 28 | 29 | 29 | 30 | 31 | 33 | 34 |

TABLE 7

PEDv contamination post-treatment in spray dried animal plasma stored at room temperature.

| | Spray Dried Plasma Average CT Count | | | | | | |
|---|---|---|---|---|---|---|---|
| Day/Treatment | 0 | 1 | 3 | 7 | 14 | 21 | 42 |
| Termin-8 | 32 | 36 | 34 | 33 | 33 | 34 | 36 |
| Sodium bisulfate | 28 | 27 | 29 | 29 | 28 | 29 | 30 |
| Sodium chlorate | 28 | 26 | 28 | 28 | 28 | 29 | 28 |
| Organic acids | 29 | 27 | 28 | 28 | 28 | 30 | 28 |
| Medium chain fatty acids | 30 | 28 | 28 | 29 | 28 | 30 | 28 |
| Essential oils | 28 | 28 | 30 | 28 | 29 | 28 | 28 |
| Untreated control | 28 | 27 | 29 | 28 | 28 | 27 | 29 |

TABLE 8

| Untreated controls stored at room temperature. PCR Untreated Day 0 Controls Over Sample Days | | | | | | | |
|---|---|---|---|---|---|---|---|
| Day/Treatment | 0 | 1 | 3 | 7 | 14 | 21 | 42 |
| SD Control | 28 | 29 | 29 | 29 | 29 | 29 | 29 |
| BM Control | 31 | 31 | 31 | 31 | 31 | 31 | 31 |
| PMBM Control | 26 | 26 | 26 | 26 | 26 | 26 | 26 |
| SDP Control | 28 | 27 | 27 | 28 | 27 | 27 | 27 |

Example IV

In a fourth study, a sister study was conducted similar to Example III above, except chemical mitigation of *Salmonella* bacteria was tested instead of PEDv.

Materials and Methods

Chemical Treatment. Six chemical treatments were applied to four different feed matrices. The chemical treatments included: 1)*Salmonella* Typhimurium positive with no chemical addition, 2) 0.3% wt/wt commercial formaldehyde product (Termin-8, Anitox Corp, Lawrenceville, Ga.), 3) 2% wt/wt essential oil (EO) blend [1:1 ratio of garlic oleoresin, turmeric oleoresin, capsicum oleoresin, rosemary extract, and wild oregano essential oils], 4) 3% wt/wt OA blend [1:1 ratio of lactic, propionic, formic, and benzoic], 5) 2% wt/wt MCFA blend [1:1 ratio of caproic, caprylic, and capric acids], and 6) 1% sodium bisulfate (Jones-Hamilton Co, Walbridge, Ohio).). The 4 matrices included: 1) feather meal, 2) avian blood meal, 3) porcine meat and bone meal, and 4) poultry by-product meal. Matrices had not be previously treated with other chemicals. One kilogram (kg) of each feed matrix was placed in a lab scale ribbon mixer where the liquid chemicals were fogged into the feed and the dry powder treatment was mixed directly into the mixer.

Inoculum Preparation. A total of 100 µL of *Salmonella enterica* subsp. *enterica* Serovar Typhimurium (ATCC14028) was placed into 10 mL of trypticase soy broth (TSB; Difco, Beston, Dickinson and Company, Franklin Lakes, N.J.) and grown for 24 h at 35° C. The culture was then centrifuged at 5000×g. Next, 7 mL of the TSB supernatant was removed. The remaining 3 mL of supernatant was then vortexed to remove cells from the side of the tube and then used for the inoculation.

Feed Ingredient Inoculation. A total of 120 g of each chemically-treated matrix was weighed and placed in plastic a total of 24 containers for inoculation. A pump spray nozzle was then used to disperse the cells across each matrix. The pump nozzle was first cleaned using ethanol, and then TSB was used to flush out the pump. Following the cleaning step, the spray nozzle was placed into the 3 mL of *Salmonella* Typhimurium cells which were then applied to the feed treatments. Once the inoculum was added, each container was shaken to mix in the inoculum throughout the matrix. Each inoculated matrix was then stored in containers at room temperature throughout the 42 day experiment. On each analysis day, the containers were opened inside a hood to prevent outside contamination.

Microbiological Analysis. On each analysis day, three samples were taken from each container. A total of 11 g per sample were placed into 99 ml of BPW and mixed. Samples were then diluted to 103, 102, and 101 and plated on Xylose lysine deoxycholate agar (XLD, Difco, Beston, Dickinson and Company, Franklin Lakes, N.J.), with a limit of detection of less than 100 CFU/g of feed matrix. Procedures were repeated on d 0, 1, 3, 7, 14, 21 and 42 to evaluate chemical effectiveness over time.

Statistical Analysis. Data were analyzed using the GLIMMIX procedure of SAS version 9.3 (SAS Inst. Inc., Cary, N.C.) after log transformation with the fixed effects of chemical treatment and feed matrix with day as a repeated measure. There were 3 replicates of each chemical treatment feed matrix combination at each sampling day. Differences were considered statistically significant at $P<0.05$.

Results

All main effects and interactions were highly significant ($P<0.001$). Overall, the MCFA, commercial formaldehyde product, OA, and EO treatments each had a lower concentration of *Salmonella* Typhimurium compared to the control ($P<0.05$). The MCFA treatment and commercial formaldehyde product were the most successful at preventing cross-contamination from *Salmonella* Typhimurium (0.51 and 0.65 CFU/g, respectively; Table 9), which were more successful than the OA treatment (1.20 CFU/g) or EO treatment (2.10 CFU/g). The sodium bisulfate treatment was similar to the control ($P=0.14$; 2.38 vs. 2.56 CFU/g).

TABLE 9

Treatment main effects for chemical means for chemically treated *Salmonella* inoculated feed matrices.

| | Chemical Treatment | | | | | | | |
|---|---|---|---|---|---|---|---|---|
| Item[1] | Control | T8 | EO | MCFA | OA | SBS | SEM | P= |
| CFU/g[2] | $2.56^a$ | $0.65^d$ | $2.10^b$ | $0.51^d$ | $1.20^c$ | $2.38^a$ | 0.08442 | <0.0001 |

[ab]Values in columns not sharing the same superscript letter are significantly different ($P \leq 0.05$).
[1]Four feed matrices were treated with six different chemical treatments and inoculated with *Salmonella enterica* subsp. *enterica* Serovar *Typhimurium* and plated on XLD over 42 days.
[2]Values are represented by $\log_{10}$ colony forming units per gram.

Differences were also observed when evaluating the main effect of feed matrix (Table 10). Values between the avian blood meal and porcine meat and bone meal were similar ($P=0.36$; 1.73 vs. 1.82 CFU/g, respectively), but were less successful at preventing cross-contamination of *Salmonella* Typhimurium than feather meal or poultry by-product meal ($P<0.05$; 1.36 vs. 1.36 CFU/g).

TABLE 10

Treatment main effects for feed matrix means for chemically treated *Salmonella* inoculated feed matrices.

| | Feed Matrix | | | | | |
|---|---|---|---|---|---|---|
| Item[1] | Avian blood Meal | Feather meal | Porcine meat and bone meal | Poultry by-product meal | SEM | P= |
| CFU/g[2] | $1.73^a$ | $136^b$ | $1.82^a$ | $1.36^b$ | 0.06893 | <0.0001 |

[ab]Values in columns not sharing the same superscript letter are significantly different ($P \leq 0.05$).
[1]Four feed matrices were treated with six different chemical treatments and inoculated with *Salmonella enterica* subsp. *enterica* Serovar *Typhimurium* and plated on XLD over 42 days.
[2]Values are represented by $\log_{10}$ colony forming units per gram.

Time also played a major role in the degradation of *Salmonella* Typhimurium. Over the 42 days of the experiment, the quantity amount of *Salmonella* Typhimurium detected decreased linearly ($P<0.05$; 4.50, 2.65, 1.75, 0.95, 0.49, 0.50, and 0.13 CFU/g for 0, 1, 3, 7, 14, 21, and 42, respectively; Table 11). With the exception of d 14 and 21 ($P=0.93$), the quantity of *Salmonella* Typhimurium detected each day differed from one another ($P<0.05$).

TABLE 11

| Treatment main effects for time means for chemically treated *Salmonella* inoculated feed matrices. | | | | | | | | | |
|---|---|---|---|---|---|---|---|---|---|
| | Day | | | | | | | | |
| Item[1] | 0 | 1 | 3 | 7 | 14 | 21 | 42 | SEM | P= |
| CFU/g[2] | 4.50$^{a}$ | 2.65$^{b}$ | 1.75$^{c}$ | 0.95$^{d}$ | 0.49$^{e}$ | 0.50$^{e}$ | 0.13$^{f}$ | 0.09118 | <0.0001 |

[ab]Values in columns not sharing the same superscript letter are significantly different (P ≤ 0.05).
[1]Four feed matrices were treated with six different chemical treatments and inoculated with *Salmonella enterica* subsp. *enterica* Serovar *Typhimurium* and plated on XLD over 42 days.
[2]Values are represented by $\log_{10}$ colony forming units per gram The MCFA mixture was the most effective chemical treatment in the avian blood meal and feather meal, followed by the commercial formaldehyde treatment. The commercial formaldehyde treatment was the most successful mitigant in the poultry by-product meal and meat and bone meal, followed by the MCFA and OA treatments (P<0.05; Table 12).

TABLE 12

| Chemical × feed matrix interaction for chemically treated *Salmonella* inoculated feed matrices | | | | | | | | |
|---|---|---|---|---|---|---|---|---|
| Item[1,2] | Control | T8 | EO | MCFA | OA | SBS | SEM | P = |
| Blood meal | 3.28$^{a}$ | 0.72$^{ij}$ | 1.36$^{gh}$ | 0.54$^{ijk}$ | 1.54$^{fgh}$ | 2.91$^{ab}$ | 0.1688 | <0.0001 |
| Feather meal | 2.68$^{bc}$ | 0.32$^{j}$ | 2.09$^{de}$ | 0.21$^{k}$ | 0.47$^{ijk}$ | 2.40$^{cd}$ | | |
| Meat/bone meal | 2.38$^{cd}$ | 0.82$^{i}$ | 3.19$^{a}$ | 0.54$^{ijk}$ | 1.49$^{fgh}$ | 2.46$^{bcd}$ | | |
| Poultry by-product | 1.90$^{ef}$ | 0.73$^{ij}$ | 1.75$^{efgh}$ | 0.73$^{ij}$ | 1.30$^{h}$ | 1.77$^{efg}$ | | |

[ab]Values in columns not sharing the same superscript letter are significantly different (P ≤ 0.05).
[1]Four feed matrices were treated with six different chemical treatments and inoculated with *Salmonella enterica* subsp. *enterica* Serovar *Typhimurium* and plated on XLD over 42 days.
[2]Values are represented by $\log_{10}$ colony forming units per gram When evaluating efficacy over time, the MCFA and commercial formaldehyde treatments were the most effective at mitigating *Salmonella* Typhimurium during the entire experimental period (P<0.05; Table 13), particularly over the days soon after treatment and inoculation. The OA treatment was also effective at mitigating *Salmonella* Typhimurium over the experimental period, but required more time for effectiveness than the MCFA or commercial formaldehyde treatments (P<0.05). The EO and SBS treatments were similar to the untreated control during the duration of the 42-d experiment.

Feed matrix had a significant impact on the *Salmonella* Typhimurium concentration over the 42 day analysis period. The *Salmonella* Typhimurium concentration of feather meal was lower (P<0.05) than the other feed matrices on d 0 and 1 post inoculation. However, poultry by-product meal had a lower (P<0.05) *Salmonella* Typhimurium concentration than the other matrices from 3 to 42 d after inoculation (Table 14). Interestingly, we observed the blood meal and meat and bone meal still had residual levels of *Salmonella* Typhimurium by the end of the 42-d experimental period, while the blood meal and feather meal matrices self-mitigated over time.

TABLE 13

| Chemical × time interaction for chemically treated *Salmonella* inoculated feed matrices | | | | | | | | | |
|---|---|---|---|---|---|---|---|---|---|
| | Day | | | | | | | | |
| Item[1,2,3] | 0 | 1 | 3 | 7 | 14 | 21 | 42 | SEM | P= |
| Control | 5.45$^{a}$ | 4.55$^{c}$ | 3.12$^{ef}$ | 2.42$^{gh}$ | 1.02$^{jk}$ | 1.19$^{jk}$ | 0.19$^{lm}$ | 0.2234 | <0.0001 |
| T8 | 3.57$^{e}$ | 0.33$^{lm}$ | UND$^{m}$ | UND$^{m}$ | 0.26$^{lm}$ | 0.37$^{lm}$ | UND$^{m}$ | | |
| EO | 5.22$^{ab}$ | 3.71$^{de}$ | 2.88$^{fg}$ | 1.45$^{ij}$ | 0.71$^{kl}$ | 0.36$^{lm}$ | 0.36$^{lm}$ | | |
| OA | 4.64$^{bc}$ | 2.44$^{gh}$ | 1.14$^{jk}$ | UND$^{m}$ | 0.17$^{lm}$ | UND$^{m}$ | UND$^{m}$ | | |
| MCFA | 2.35$^{gh}$ | 0.66$^{kl}$ | 0.17$^{lm}$ | UND$^{m}$ | UND$^{m}$ | 0.36$^{lm}$ | UND$^{m}$ | | |
| SBS | 5.75$^{a}$ | 4.21$^{cd}$ | 3.16$^{ef}$ | 1.85$^{hi}$ | 0.77$^{kl}$ | 0.72$^{kl}$ | 0.23$^{lm}$ | | |

[ab]Values in columns not sharing the same superscript letter are significantly different (P ≤ 0.05).
[1]UND, undetectable (counts that averaged less than 100 CFU/g had its log reported as such).
[2]Four feed matrices were treated with six different chemical treatments and inoculated with *Salmonella enterica* subsp. *enterica* Serovar *Typhimurium* and plated on XLD over 42 days.
[3]Values are represented by $\log_{10}$ colony forming units per gram

TABLE 14

Feed matrix × time interaction for chemically treated *Salmonella* inoculated feed matrices.

| Item[1,2,3] | Day 0 | 1 | 3 | 7 | 14 | 21 | 42 | SEM | P= |
|---|---|---|---|---|---|---|---|---|---|
| Blood meal | $4.85^{a}$ | $2.85^{c}$ | $1.87^{ef}$ | $1.27^{gh}$ | $0.52^{jkl}$ | $0.60^{ijkl}$ | $0.13^{lm}$ | 0.1824 | <0.0001 |
| Feather meal | $3.41^{b}$ | $2.12^{e}$ | $1.58^{fg}$ | $1.06^{hi}$ | $0.48^{klm}$ | $0.86^{hijk}$ | UND$^{m}$ | | |
| Meat/bone meal | $4.86^{a}$ | $2.77^{cd}$ | $2.31^{de}$ | $1.00^{hij}$ | $0.84^{hijk}$ | $0.53^{jkl}$ | $0.39^{klm}$ | | |
| Poultry by-product | $4.87^{a}$ | $2.86^{c}$ | $1.22^{gh}$ | $0.48^{klm}$ | $0.11^{lm}$ | UND$^{m}$ | UND$^{m}$ | | |

[ab]Values in columns not sharing the same superscript letter are significantly different (P ≤ 0.05).

[1]UND, undetectable (counts that averaged less than 100 CFU/g had its log reported as such).

[2]Four feed matrices were treated with six different chemical treatments and inoculated with *Salmonella enterica* subsp. *enterica* Serovar *Typhimurium* and plated on XLD over 42 days.

[3]Values are represented by $\log_{10}$ colony forming units per gram

Discussion

The purpose of this experiment was to evaluate if categories of chemical treatments could prevent post-processing *Salmonella* Typhimurium contamination, which was determined by quantifying the concentration of *Salmonella* Typhimurium colonies present by XLD plating. Surprisingly, the MCFA mixture performed similar to the commercial formaldehyde product (T8). Time, MCFA, commercial formaldehyde product, OA, and EO all decreased the presence of *Salmonella* Typhimurium in feed ingredients, but those results varied based on the feed ingredient. *Salmonella* Typhimurium concentration was relatively stable in the avian blood meal over 42 days, compared to 21 days in the other three feed ingredients. The MCFA and formaldehyde treatments were most effective at preventing post-processing contamination of rendered protein meals.

Example V

In the fifth study, solutions of sodium bisulfate (SBS) were applied to the surface of dry dog food (kibble) at levels of 0%, 0.2%, and 0.4% based on the total % of the diet by weight. SBS was also applied to the surface of dry cat food at levels of 0%, 0.6%, and 0.8% based on the total % of the diet by weight. Samples were tested on days 0, 1, 2, 7, and 14 and *Salmonella* levels were calculated based on colony-forming unit per gram (CFU/g). The results of are shown in Tables, 15 and 16 below.

Table 15. *Salmonella* reduction over time as a result of coating dog foods with sodium bisulfate at two different levels.

| Day/Treatment | Log10 cfu/g *Salmonella* 0% | 0.20% | 0.40% |
|---|---|---|---|
| 0 | 4.84 | 4.92 | 4.95 |
| 1 | 3.56 | 3.65 | 3.61 |
| 2 | 3.64 | 2.67 | 2.51 |
| 7 | 3.2 | 2.21 | 2.05 |
| 14 | 3.36 | 2.08 | 1.92 |

TABLE 16

*Salmonella* reduction over time as a result of coating cat foods with sodium bisulfate at two different levels

| Day/Treatment | Log10 cfu/g *Salmonella* 0% | 0.60% | 0.80% |
|---|---|---|---|
| 0 | 4.43 | 4.41 | 4.29 |
| 1 | 3.73 | 3.22 | 3.16 |
| 2 | 3.01 | 2.55 | 2.63 |
| 7 | 3.21 | 1.64 | 1.38 |
| 14 | 3.48 | 1.17 | 1 |

Example VI

Background:

In a sixth study, a model was developed to evaluate the transboundary risk of PEDv-contaminated swine feed ingredients and experiments were conducted to evaluate the effect of two mitigation strategies during a simulated transport event from China to the United States. The study was based on the hypothesis that while select non-treated ingredients could provide a protective effect on PEDv survival, mitigation would reduce risk.

Sample Size

A total of 360 feed ingredient samples were used for this study.

Methods:

Design of Shipping Model—

Route and Timetable

Based on the predominance of facilities processing agricultural feed ingredients for export in the eastern region of China, i.e., Shandong, Jilin, Henan, Hebei and Liaoning provinces (www.alibaba.com), and that the PEDv strain initially detected in the U.S. most closely resembled a variant from the province of Anhui, the city of Beijing was designated as the starting point for the model. Here it was assumed that PEDv contamination of select ingredients would occur either at the manufacturing plant or post-processing. In an effort to determine if PEDv could be delivered in a viable state from Beijing to a major pork production region in the U.S., Des Moines, Iowa was selected as the final destination. Based on these assumptions, a commercial website (SeaRates.com) was used to develop a representative route and timetable. Specifically, it was modeled that contaminated ingredients would travel for 1 day from Beijing to the Anquing terminal in Shanghai, where they would be held for 7 days in preparation for shipment to the U.S. Cargo would then travel across the Pacific Ocean over a 17 day period and enter the U.S. at the port of San Francisco. Following a 7 day period to clear customs, it would then be transported for 2 days via Interstate 80 to Des Moines, where it would remain for 3 days, for a total transit period of 37 days.

Compilation of Environmental Data

Once the 37-day timetable had been established, it was decided to model the shipping event over the period of Dec. 23, 2012 to Jan. 28, 2013. This decision was based on the timing of the initial detection of PEDv in the U.S. (April 2013) and the availability of data summarizing temperature and relative humidity (% RH) in shipping containers traveling from Asia to the U.S. during the period of Dec. 31, 2012 to Jan. 16, 2013. Using this information, a temperature and % RH curve were designed for the oceanic segment of the study. In addition, historical meteorological data were accessed for the land segments of the model using Weather Underground (www.wunderground.com) encompassing the periods of Dec. 23-30, 2012 and Jan. 17-27, 2013, which were paired in conjunction with the oceanic transport period. To simulate the effect of daily fluctuation, historical temperature data were collected at 4 designated times each day (6 AM, 12 PM, 6 PM, 12 AM) and at 3 designated times each day for % RH (8 AM, 12 PM, 4 PM). All data were then entered into the computer of an environmental chamber used to house samples during the model shipping period.

Processing of Feed Ingredients

A panel of 14 swine feed ingredients known to be imported to the U.S. from China were selected for this study, including organic & conventional soybeans and soybean meal, lysine hydrochloride, D-L methionine, tryptophan, Vitamins A, D & E, choline chloride, two ingredient carriers (rice hulls or corn cobs) and feed-grade tetracycline. Ingredients were screened by PCR to insure a PEDv-negative status prior to the onset of the study. The treatments selected for the study included a liquid antimicrobial (LA) (SalCURB®, Kemin Industries, Des Moines, Iowa USA) or a medium chain fatty acid blend (MCFA). SaCURB® is a premix of aqueous formaldehyde solution 37% (for maintenance of complete animal feeds or feed ingredients *Salmonella*-negative for up to 21 days) and propionic acid (as a chemical preservative for control of mold in feed or feed ingredients). While SaCURB® provides effective *Salmonella* control for up to 21 days, it is not approved for use by the U.S. Food & Drug Administration or the U.S. Department of Agriculture as a treatment for PEDv. The second treatment, MCFA, was a 2% custom medium chain fatty acid blend of caproic, caprylic and capric acids, blended at a 1:1 ratio. Control ingredients were treated with sterile saline.

Sample Management

It was decided to organize all samples into 1 of 4 identical batches, each representing a specific segment of the 37-day shipping period. Batch 1 (segment 1) was designed to represent the transport of contaminated ingredients from manufacturing plants in Beijing to the Shanghai Anquing terminal (day 1 post-contamination (DPC)). Batch 2 was a compilation of segments 1 and 2, simulated manufacturing and delivery to Shanghai, as well as time in the Anquing terminal awaiting shipment (1-8 DPC). Batch 3 was a compilation of segments 1, 2 and 3 represented time in China, the crossing of the Pacific and arrival to the US at the San Francisco, Calif. terminal (1-27 DPC). Finally, batch 4 was a compilation of segments 1-4, thereby representing the entire process, including transport to and storage in, Des Moines, Iowa (1-37 DPC). On designated days post-contamination, a batch of samples was removed from the environmental chamber and submitted for testing. Specifically, batch 1 was submitted on 1 DPC, batch 2 on 8 DPC, batch 3 on 27 DPC and batch 4 on 37 DPC. In other words, the same sample was not repeatedly opened and tested, but rather a new batch of samples was submitted on a designated day. This method of sample management would ensure that all sample containers remained sealed from the time they were inoculated until the time they were tested at the lab, minimizing the risk of cross-contamination, as well as enhancing repeatability of results as several segments were replicated across batches. Finally, to increase statistical power, each of the 4 batches contained 2 replicates of each ingredient in the control group and 2 replicates of each ingredient within each treatment group, for a total of 90 samples per batch.

Sample Contamination Procedures

A goal of the study was to limit the variability to the level of the ingredient; therefore, the same quantity of ingredient, the same container type and the same environmental settings were used and samples were contaminated equally. To initiate this process, 30 g of each ingredient were added to food storage containers (OXO Tot Baby Blocks, OXO International, El Paso, Tex., USA) to simulate a shipping container. Ingredients in the non-treated control group were treated with 0.1 mL of sterile saline. Ingredients in the LA group were treated with 0.1 mL of product, based on an inclusion rate of 3 kg/ton of complete feed. Ingredients in the MCFA group were treated with 0.6 g of product based on a 2% inclusion rate. Individual treatments and saline placebo were added to the designated samples using separate tuberculin syringes. To promote proper mixing, the feed was stirred manually for 10 clockwise rotations and 10 counterclockwise rotations using individual wooden applicator sticks per ingredient. Following mixing, each individual container was manually shaken vigorously (50 times in a 10 second period). All samples were then inoculated with 2 mL PEDv (passage 18, Ct=17.15, total dose 491,520 FFU) and mixed as described. This quantity of PEDv was selected in an effort to provide a final mean Ct value in feed ingredient of approximately 25 (range=19-30) following mixing, based on data from actual field cases of PEDV-contaminated feed, a challenge level used in published studies.

Controls

For the purpose of negative controls, 30 g samples of PEDv-negative complete feed were inoculated with sterile saline. Duplicate negative controls were included in each of the 4 batches, across the control and treatment groups. For the purpose of positive controls, duplicate 5 mL samples of stock PEDv in minimum essential media (Difco, Detroit, Mich., USA) were included in containers within each batch of ingredients in both control and treatment groups.

Sample Storage

Once prepared, samples were stored in the environmental chamber. This instrument (Model 9005L, Sheldon Manufacturing Inc., Cornelius Oreg.) had a programmable temperature range of 4-21° C. and a RH range of 40-95%. In order for ingredients to be exposed to ambient air within the chamber, two holes, 0.318 cm in diameter were drilled into each plastic container. Using the data from the historical temperature and % RH curve described above, the chamber computer was programmed to simulate fluctuation over time as previously described.

Diagnostic Procedures

All diagnostic testing was conducted using protocols developed and validated by the South Dakota State University (SDSU) Animal Disease Research and Diagnostic Laboratory (ADRDL). Samples were submitted by code to the laboratory, so personnel were blinded as to day, treatment and ingredient type. It was originally planned to test all samples by PCR and virus isolation (VI), followed by the use of swine bioassay for samples determined to be PCR positive but VI negative.

Extraction of RNA

The MagMAX™ 96 Viral Isolation Kit (Life Technologies, Waltham Mass., USA) was used to obtain viral RNA from the samples, as described in the instructions provided (1836M Revision F). A 175-μl volume of sample was used for the extraction. The magnetic bead extractions were completed on a Kingfisher96 instrument (Thermo Scientific, Waltham Mass., USA).

Real-Time PCR

A commercially available real-time, single tube RT-PCR multiplex assay for the detection of PEDv, porcine deltacoronavirus (PDCoV) and transmissible gastroenteritis virus (TGEV) was used in this study per kit instruction (Tetracore, Rockville, Md., USA). Briefly, 7 μl of the extracted RNA was added to 18 μl of the master mix. The one-step real-time RT-PCR amplification conditions started with 15 minutes at 48° C., followed by 2 minutes at 95° C. The final cycles consisted of 5 seconds at 95° C. and then 40 seconds at 60° C. (data collection step). The program was run for 38 cycles (Cycle time) with PEDv positive results indicated at ≤38 cycles. Positive and negative controls were included on each run. All amplification was completed on the ABI7500 instrumentation (Austin, Tex., USA).

PEDv Stock Virus Propagation

For PEDv propagation, Vero 76 cells (ATCC CRL-1587) were maintained in MEM plus 10% fetal bovine serum and antibiotics. Three-day old confluent monolayers of Vero 76 cells in 150 $cm^2$ flasks were washed 3 times with serum free minimum essential media (MEM) prior to inoculation. Monolayers were infected at ~0.1 moi of PEDv in MEM containing 2 ug/ml TPCK treated trypsin, incubated at 37° C. for approximately 48 hours until obvious CPE was apparent. Flasks were frozen at −80° C. until needed.

Virus Isolation

Once feed ingredient samples were tested for PEDv via PCR, the residual samples were tested for presence of viable virus. Samples were diluted in MEM containing 2 μg/ml TPCK-treated trypsin with a starting dilution of 1:2 and were two-fold serially diluted. Diluted samples were then added to washed confluent monolayers of Vero-76 cells in 96-well plates and incubated for 1 hour at 37° C. Plates were again washed and trypsin media replaced. After 24 hours at 37° C., plates were fixed with 80% acetone and stained with FITC conjugated mAb SD6-29 to allow visualization of infected cells. Virus concentration was determined by calculating FFU/ml based on the number of fluorescent foci present in wells at selected dilutions using a previously published method adapted to PEDv. Personnel reading the plates were blinded to the type of sample and the time of sampling.

Swine Bioassay—

Facilities and Source of Animals

The purpose of the swine bioassay was to determine whether viable PEDv was present in any feed ingredient sample that had tested positive on PCR but negative on VI. This study was conducted in a Biosafety Level 2+ room at the Animal Resource Wing (ARW) at South Dakota State University. All procedures involving animals throughout the study were performed under the guidance and approval of the SDSU Institutional Animal Care and Use Committee. Animals (n=24, 5 day old piglets) were sourced from a PEDv-naïve herd and were tested on arrival to the ARW via blood sampling and collection of rectal swabs from each pig. Prior to animal arrival, all rooms (walls, ceilings, floors and drains) were monitored for the presence of PEDv by PCR. Piglets were housed in one of 6 stainless steel gnotobiotic units measuring 0.6 m W×1.2 m L×0.6 m H. Units were divided into 4 semi-isolated housing units, allowing for 4 piglets per unit with individual feeding arrangements. Flooring consisted of an open weave rubberized mat on a perforated stainless steel grate raised 10 cm for waste collection. Each unit was covered with an inflatable 20 mil plastic canopy and fitted with 2 pair of dry-box gloves for feeding and procedures inside the canopy. Each canopy was secured and sealed with duct tape and ratchet straps to the unit. Ventilation was supplied by an electric fan maintaining sufficient positive pressure inside the canopy to keep the canopy inflated above the unit. Incoming and outgoing air to each unit was HEPA-filtered. Each unit was initially sterilized using 47% aerosolized formalin, and allowed to dissipate for 2 weeks prior to introduction of the animals. All incoming and outgoing materials needed during the study (e.g., swabs, injectable medication, bleeding supplies) were passed through an air-tight stainless steel port and sterilized using 5% peracetic acid before entering or exiting the port.

Preparation of Bioassay Inoculum

The stainless steel unit served as the experimental unit; therefore, all 4 piglets in each unit received the same ingredient. To assess PEDv survivability throughout the entire model period, it was planned to test samples from batch 4, including both treated and non-treated ingredients. Regarding non-treated samples, all PCR-positive and VI-negative samples in batch 4 were tested. In regards to LA-treated and MCFA-treated ingredients, it was planned to test the treated equivalents of non-treated samples that were VI or swine bioassay positive, again from batch 4 samples. For preparation of the inoculums, 60 g of each specific ingredient was mixed with 50 mL of sterile PBS in a 250 mL centrifuge tube, inverted 10 times to mix and vortexed for 2 minutes. The suspension was then centrifuged at 5,200 g for 15 minutes, supernatant decanted and tested by PCR prior to piglet inoculation. Each pig in the unit received 1 mL of the designated inoculum orally via syringe and observed for a 7 day period. To minimize the number of animals needed for the study, pigs that were confirmed negative after 7 DPI would be inoculated with a different ingredient. A negative control unit was included in the design, with these pigs receiving sterile saline PO.

Piglet Testing

Following inoculation, the PEDv status of each group of piglets was monitored. On a daily basis, ARW personnel inspected animals for clinical signs of PED and collected rectal swabs (Dacron swabs, Fisher Scientific, Franklin Lakes, N.J., USA) from each pig, starting with the negative control unit. Showers were taken upon entry to the rooms and room-specific coveralls, footwear, hairnets, gloves and P95 masks (3M, St. Paul, Minn. USA) were worn. In addition, each room was ventilated individually and HEPA filtration for both incoming and outgoing air was employed per room. If clinically affected animals were observed, swabs of diarrhea and/or vomiting, in conjunction with the daily rectal swab were collected. Swabs were submitted to the SDSU ADRDL and tested by PCR. If PEDv was diagnosed in a specific unit, all animals were swabbed, humanely euthanized with intravenous sodium pentobarbital, the small intestinal tracts submitted for PCR testing, units were cleaned and sanitized as described and re-stocked with new piglets as needed.

Data Analysis

Descriptive Statistics, T-Test and ANOVA were Used to Analyze Data.

Results

PCR

All feed ingredient samples were PCR negative on day 0 of the study. Successful PEDv inoculation was confirmed, as all day 1 samples were PCR-positive. Results of PCR testing of treated and non-treated ingredients on 1 and 37 DPC are summarized in Table 17, below. The mean Ct of LA-treated samples was 24.5 (SD=2.4) on 1 DPC and 32.5 (SD=3.9) on 37 DPC ($p<0.0001$). The mean Ct of MCFA-treated samples was 24.2 (SD=4.2) on 1 DPC and 25.5 (SD=3.7) on 37 DPC ($p=0.25$). The mean Ct values across non-treated ingredients on day 1 was 22.9 (SD=2.4) and 23.1 (SD=3.5) on day 37 ($p=0.34$). At 1 DPC, the mean Ct values of all 3 groups (non-treated, LA-treated and MCFA-treated) were not significantly different ($p=0.14$); however, at 37 DPC, the mean Ct of LA-treated samples was significantly higher ($p<0.0001$) than the mean Ct of MCFA-treated and non-treated samples.

TABLE 17

Summary of PCR Ct data (mean/SD) across treated and non-treated groups on day 1 and 37 of the study.

| Group | Day 1 mean/SD | Day 37 mean/SD |
|---|---|---|
| Control ingredients | 27.9$^{a}$/2.4 | 23.1$^{a}$/3.5 |
| LA-treated ingredients | 24.5$^{a}$/2.4 | 32.5$^{a}$/3.9 |
| MCFA-treated ingredients | 24.2$^{a}$/4.2 | 25.5$^{a}$/3.7 |

Values with different superscipts ($^{a/b}$) are significantly different at $p < 0.05$ Virus Isolation A summary of VI data is provided in Table 18, below. Viable PEDv was recovered from conventional SBM, lysine and Vitamin D across all 4 batches of non-treated samples, including batch 3 representing entry to the US at the San Francisco terminal and batch 4, representing shipment to and storage in Des Moines. Due to mold growth in the batch 4 non-treated organic soybean meal sample, VI was not possible. No other samples harbored viable virus beyond batch 2 (Beijing and Shanghai segments) including the PEDv stock virus control. Multiple samples were VI negative on 1 DPC. All negative control samples and all LA-treated or MCFA-treated ingredients were VI negative across all batches.

TABLE 18

Summary of mean PCR Ct and FFU/mL across all 4 batches of non-treated ingredients.

| Ingredient | Mean Ct/FFU titer Batch 1 | Mean Ct/FFU titer Batch 2 | Mean Ct/FFU titer Batch 3 | Mean Ct/FFU titer Batch 4 |
|---|---|---|---|---|
| Soybeans organic | 20.76/5120 | 23.27/neg | 26.42/neg | 25.52/neg |
| Soybean meal (organic) | 19.20/40,960 | 19.10/1920 | 20.10/800 | 22.55/NT (mold) |
| Soybeans (conventional) | 22.39/3840 | 24.18/40 | 28.86/neg | 20.99/neg |
| Soybean meal (conventional) | 19.75/7680 | 19.71/1920 | 19.76/5120 | 16.04/60 |
| Lysine hydrochloride | 18.54/1280 | 18.51/40 | 18.79/100 | 17.83/100 |
| D-L methionine | 22.17/2560 | 21.25/neg | 25.03/neg | 19.50/neg |
| Tryptophan | 23.56/160 | 22.54/neg | 25.30/neg | 21.31/neg |
| Vitamin A | 25.22/neg | 22.66/neg | 25.23/neg | 26.85/neg |
| Vitamin D | 22.28/3840 | 21.29/640 | 22.72/320 | 20.94/40 |
| Vitamin E | 28.54/neg | 22.86/neg | 26.15/neg | 30.86/neg |
| Choline chloride | 20.82/40 | 20.90/40 | 20.4/neg | 20.77/neg |
| Rice hulls | 24.73/neg | 24.47/neg | 25.93/neg | 22.99/neg |
| Corn cobs | 23.66/80 | 22.83/neg | 24.68/neg | 24.49/neg |
| Tetracycline | 38/neg | 38/neg | 38/neg | 38/neg |
| (−) control feed | 38/neg | 38/neg | 38/neg | 38/neg |
| Virus stock | 17.5/245,760 | 18.86/30 | 21.19/neg | 23.73/neg |

Ingredient: Two 30 g replicates per ingredient.

Mean Ct/FFU titer: Mean Ct value and FFU/mL across the 2 samples per ingredient.

Swine Bioassay

Samples selected for swine bioassay testing consisted of treated and non-treated ingredients from batch 4. The non-treated ingredients tested included those which were PCR-positive and VI-negative, specifically Vitamins A & E, tryptophan, D-L methionine, Soybeans (organic and conventional), choline chloride. Viable PEDv was detected in piglets administered non-treated samples of organic soybean meal and choline chloride (Table 19a). Affected animals displayed evidence of mild diarrhea, shed PEDv in feces and samples of small intestine were PCR-positive at necropsy. With regard to treated ingredients, LA-treated and MCFA-treated samples of soybean meal (conventional and organic), lysine, vitamin D, and choline chloride were tested. All piglets inoculated with the aforementioned LA-treated or MCFA-treated ingredients were determined to be non-infectious, as the piglets remained clinically normal throughout the testing period and all rectal swab and intestinal samples were negative by PCR (Table 19b).

TABLE 19a

Summary of results of PCR (+)/VI (−) non-treated control feed ingredients from batch 4 tested by swine bioassay.

| Ingredient | Ct of inoculum | Clinical signs/rectal swabs | PCR testing of small intestine |
|---|---|---|---|
| Soybean meal-organic | 22.56 | positive | positive |
| Soybean-organic | 25.52 | negative | negative |
| Soybean-conventional | 26.34 | negative | negative |
| Vitamin A | 26.86 | negative | negative |
| Vitamin E | 30.86 | negative | negative |
| Rice hulls | 22.94 | negative | negative |
| Corn cobs | 23.95 | negative | negative |
| Tryptophan | 21.31 | negative | negative |
| D/L methionine | 19.75 | negative | negative |
| Choline chloride | 20.79 | positive | positive |
| (−) control | >38 | negative | negative |

TABLE 19b

Summary of results of PCR (+)/VI (−) LA-treated or MCFA-treated control feed ingredients from batch 4 tested by swine bioassay.

| Ingredient* | Treat-ment | Ct of inoculum | Clinical signs & rectal swabs | PCR testing of small intestine |
|---|---|---|---|---|
| Soybean meal-conventional | LA | 31.44 | negative | negative |
| Soybean meal-organic | LA | 22.38 | negative | negative |
| Vitamin D | LA | 38 | negative | negative |
| Lysine | LA | 17.83 | negative | negative |
| Choline chloride | LA | 33.70 | negative | negative |
| Soybean meal-conventional | MCFA | 23.78 | negative | negative |
| Soybean meal-organic | MCFA | 17.75 | negative | negative |
| Vitamin D | MCFA | 20.60 | negative | negative |
| Lysine | MCFA | 20.33 | negative | negative |
| Choline chloride | MCFA | 21.24 | negative | negative |
| (−) control | Saline | 38 | negative | negative |

*Ingredients were selected based on the recovery of viable PEDv in their non-treated equivalent samples.

Environmental Data

Table 20 provides a summary of the mean daily temperature and % RH data recorded in the environmental chamber throughout the 37-day study period. For the purpose of statistical analysis, the 37-day period was divided into 4 segments: Days 1-8, representing time in China, days 9-25, representing time travelling across the Pacific, days 26-32, representing time spent in the San Francisco terminal and days 33-37, time spent during transport from California to Iowa with time in Des Moines. In summary, mean temperature and mean % RH recorded during the San Francisco segment were significantly different (p=0.0004 and p=0.0025, respectively) from that recorded during the other 3 segments.

TABLE 20

Descriptive summary of temperature and % RH data per the 4 segments of the 37-day study period.

| Temp ° C. | Segment 1 (China) 1-8 DPC | Segment 2 (Pacific) 9-25 DPC | Segment 3 (SF) 26-32 DPC | Segment 4 (DSM) 33-37 DPC |
|---|---|---|---|---|
| Mean | 5.5 | 6.0 | 8.4 | 3.9 |
| 95% CI | 4.3-6.7 | 5.2-6.8 | 7.1-9.6 | 2.5-5.4 |
| SD | 1.4 | 2.0 | 1.2 | .13 |
| Median | 4.8 | 5.5 | 8.3 | 3.9 |
| Range | 4.2-7.8 | 3.9-9.4 | 6.3-10 | 3.9-4.2 |
| **% RH** | **Segment 1 (China) 1-8 DPC** | **Segment 2 (Pacific) 9-25 DPC** | **Segment 3 (SF) 26-32 DPC** | **Segment 4 (DSM) 33-37 DPC** |
| Mean | 71 | 63 | 84 | 76 |
| 95% CI | 63-79 | 58-69 | 75-92 | 66-87 |
| SD | 21.6 | 1.3 | 6.2 | 13.1 |
| Median | 70 | 63 | 83 | 70 |
| Range | 26-92 | 62-66 | 73-94 | 64-92 |

DISCUSSION

While the effect of the LA on PEDv RNA degradation over the course of the study was significantly different than the response to MCFA, both products appeared to have equivalent effect on virus viability. This outcome supports the validity of chemical mitigation as a means to reduce the risk of PEDv in feed ingredients, as well as provides options for treatment.

The invention claimed is:

1. A method of inhibiting porcine epidemic diarrhea virus in animal feed or animal feed ingredients, the method comprising:

providing the animal feed or animal feed ingredients to an animal infected with porcine epidemic diarrhea virus, wherein the animal feed or animal feed ingredients include a chemical mitigant comprising at least one medium chain fatty acid.

2. The method of claim 1, further comprising storing the animal feed or animal feed ingredients for at least about 37 days prior to providing the animal feed or animal feed ingredients to the animal.

3. The method of claim 2, wherein storing comprises holding and/or transporting the animal feed or animal feed ingredients at about room temperature.

4. The method of claim 1, wherein the at least one medium chain fatty acid is selected from the group consisting of caproic acid, caprylic acid, capric acid and lauric acid.

5. The method of claim 1, wherein the at least one medium chain fatty acid excludes lauric acid.

6. The method of claim 1, wherein the chemical mitigant is a blend of two or more medium chain fatty acids and at least one essential oil.

7. The method of claim 6, wherein the blend of two or more medium chain fatty acids comprises caproic acid, caprylic acid and capric acid.

8. The method of claim 6, wherein the at least one essential oil comprises garlic oleoresin, turmeric oleoresin, capsicum oleoresin, rosemary extract, and/or wild oregano essential oils.

9. The method of claim 1, wherein the animal feed or animal feed ingredients are selected from the group consisting of swine feed, blood meal, porcine meat and bone meal (MBM), spray-dried animal plasma, feather meal, avian blood meal, poultry by-product meal, vitamin D, lysine hydrochloride, choline chloride, and soybean meal.

10. The method of claim 1, wherein the chemical mitigant further comprises sodium bisulfate.

11. The method of claim 10, further comprising applying the sodium bisulfate to a surface of the animal feed or animal feed ingredients prior to providing the animal feed or animal feed ingredients to the animal.

* * * * *